July 20, 1948.　　　　　M. SILGE　　　　　2,445,499
REFRACTOMETERS BASED ON THE PRINCIPLE
OF TOTAL REFLECTIONS
Filed June 15, 1946
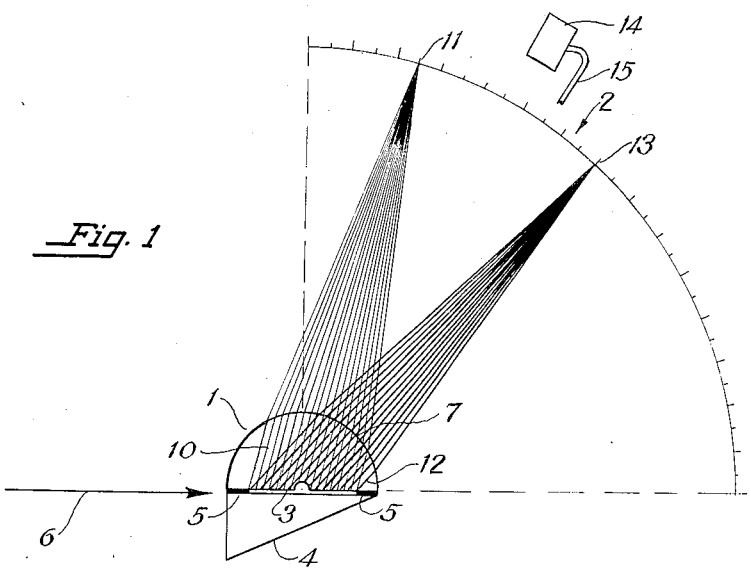
Fig. 1
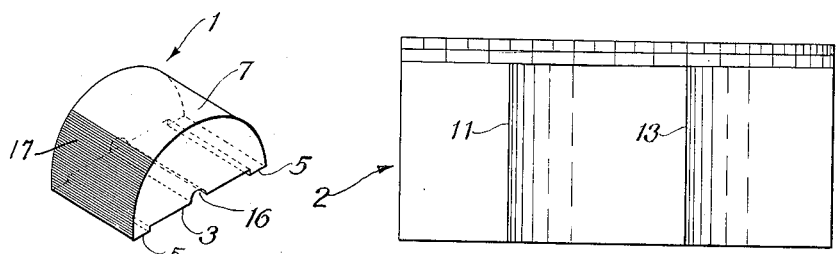
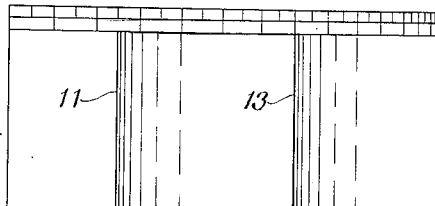
Fig. 2　　　　　Fig. 3
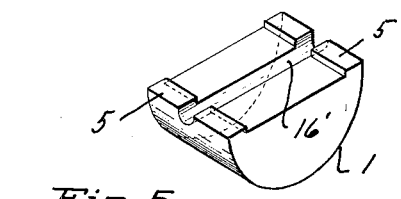　　　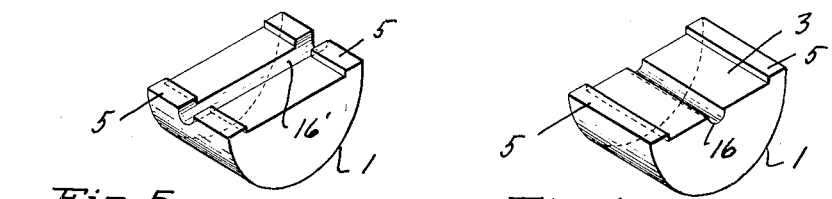
Fig. 5　　　　　Fig. 4
INVENTOR.
Martin Silge
BY
A. Schapp
ATTORNEY Patented July 20, 1948

2,445,499

UNITED STATES PATENT OFFICE 2,445,499

REFRACTOMETER BASED ON THE PRINCIPLE OF TOTAL REFLECTIONS

Martin Silge, Oakland, Calif.

Application June 15, 1946, Serial No. 676,878

2 Claims. (Cl. 88—14)

The present invention relates to improvements in refractometers based on the principle of total reflection, and its principal object is to provide a refractometer of the character described that is simple in construction, has a wide range of utility, allows refractive indices of test objects or data based thereon to be determined to a fine degree and with great accuracy, and which does not use any mechanical adjustments.

Popular types of refractometers utilizing the principle of total reflection, such as the Abbe refractometer, the Dipping refractometer, the Pulfrich refractometer and modifications thereof, comprise as fundamental units, an index prism, a telescope and a graduated scale.

The index prism refracts light entering its entrance surface in accordance with the laws of refraction. The amount of refraction depends on the difference in refractive indices of the index prism and the medium in optical contact with its entrance surface, i. e., usually that of the test object.

A second refraction takes place on the plane exit surface of the prism. The amount of this refraction again depends on the difference of refractive indices of the prism and the medium in optical contact with the exit surface, usually air. Another important factor, however, is the angle embraced by the entrance and exit surfaces of the prism, the "refracting angle."

A telescope focused at a great distance then serves to render the borderline of total reflection through the index prism observable. The relative position of said borderline is read against a suitable graduated scale which translates the varying positions of the borderline into desirable units such as angular degrees, refractive indices, percent soluble solids, etc.

The total magnification of the telescope largely determines the theoretical reading accuracy of the refractometer inasmuch as the displacement of the relative positions of the borderline of total reflection will be greater the higher the magnification, enabling the observer, therefore, to read it against a greater number of scale units.

The use of a telescope as a means of observing the borderline of total reflection necessarily imposes certain limitations on a refractometer set by the characteristics of the telescope itself. Two of the most important limitations are:

1. That the magnification largely also determines the length of the telescope and consequently cannot be increased beyond a certain moderate amount in order to keep the physical dimensions of a refractometer within tolerable limits; and 2. That, everything else being equal, the magnification of a telescope is roughly reversely proportional to its field of view.

Consequently, the higher the magnification of the telescope, the narrower the range of the refractometer. To compensate for this limitation, certain types of refractometer have the telescope mounted for movement relative to the index prism. But the mechanical parts necessary for this purpose set up new limitations imposed by the unavoidable errors inherent in mechanical imperfections.

Refractometers employing high telescope magnification and of rigid construction between the index prism and telescope, such as the Dipping refractometer, are free of these mechanical limitations, but in turn require a whole series of interchangeable prisms in order to cover the full range of refractive indices, which is cumbersome and entails new difficulties.

In the present invention it is proposed to dispense with the use of the conventional telescope and to avoid the limitations imposed by the latter.

More particularly, it is proposed to use an index prism the exit surface of which is optically effective to form an image of the borderline of total reflection at a definite distance, the focal distance of the image being a function of said surface.

It is further proposed to mount a screen at the said distance from the index prism to render the images visible thereon, and to provide suitable scale divisions thereon.

And finally, it is proposed to provide suitable magnifying means facilitating reading of the scale divisions to fine decimal points.

Further objects and advantages of my invention will be disclosed as the specification continues, and the new and useful features of my refractometer will be fully defined in the claims hereto appended.

The preferred forms of the invention are illustrated in the accompanying drawing forming part of this application, in which:

Figure 1 diagrammatically illustrates the operation of my invention;

Figure 2 is a perspective view of the index prism used in my invention;

Figure 3, an outside view of the screen used in my invention;

Figure 4, a perspective view of the index prism, taken at a different angle; and Figure 5, a perspective view of a modified form of index prism.

While I have shown only the preferred forms of my invention, I wish to have it understood that various changes or modifications may be made within the scope of the claims attached hereto, without departing from the spirit of the invention.

Referring to the drawing in detail, my refractometer comprises in its principal features, an index prism 1 and a screen 2.

The index prism has a flat entrance surface 3 which is here shown as resting on the upper face of a diffusing prism 4, suitable spacing means 5 providing sufficient space between the diffusing prism and the index prism to accommodate a liquid to be tested. The rays of light are indicated by the arrow 6.

It should be understood that the diffusion prism is only one means of holding a liquid in optical contact with the entrance face of the index prism, and that any other suitable means may be substituted for the same. The index prism is here shown as having the entrance face presented downwardly, but for the purposes of my invention, it does not make any difference whether the entrance face is on top or at the bottom, or in any other suitable working position.

The exit surface 7 of the index prism is curved in such a manner that it forms an image of the borderline of total reflection at a definite distance, the focal distance of the image being a function of said surface.

The exit surface of the index prism is here shown as being semi-cylindrical, but it might be spherical, aspherical, or of any suitable curvature designed to bring outgoing rays which pass through the index prism in parallel relation, to focus at a definite distance from the prism.

The exit surface 7 is preferably made an integral part of the index prism, as shown, but it may be a separate part cemented thereto, or spaced therefrom. The focal length of this exit surface will determine the distance at which a real image of the borderline of total reflection will come to focus.

Different foci of different borderlines of total reflection will thus be projected upon a common plane which may be termed the focal plane, and the screen 2 is mounted in this focal plane to render the images of the foci of different borderlines of total reflection visible.

The screen 2 is suitably sub-divided to present scale graduations.

The relative positions of different borderlines of total reflection can thus be observed on the screen, and since the latter may be mounted at a considerable distance from the index prism, depending upon the optical characteristics of the exit surface of the prism, it is obvious that a single screen can cover the entire range of the prism and that fairly minute observations may be obtained from the screen scale, even with the naked eye.

The use of the telescope, therefore, has become unnecessary.

Figure 1 illustrates the path of light for two test objects of different refractive indices, say, air and water. Where a body of air is in optical contact with the entrance surface of the index prism, the rays 10 of the borderline of total reflection are refracted to a high degree upon entering the index prism.

At the exit surface of the index prism the rays 10 are made to converge to a focus 11 which forms an image of the borderline of total reflection in the shape of a dividing line, the space above the line (or to the left, as shown in Figure 1) being light, and the space below the line being dark.

Where a body of water is in optical contact with the entrance surface of the index prism, the rays 12 of the borderline of total reflection are refracted to a less degree when entering the index prism. They are made to converge at the exit surface to a focus 13 forming an image on the screen widely spaced from image 11. In that case, the borderline of total reflection will appear at 13, the space above the line being light, and that blow the line being dark.

In view of the wide spacing, it is possible to make scale readings of fairly minute degree, even with the naked eye. Since the screen is fixed with respect to the index prism, no mechanical adjustments are required, and the operator may readily test the device for accuracy by taking a reading on air as the reference medium.

If reading to a higher decimal is desired, a magnifying glass may be used or a microscope indicated at 14, which for convenience of operation may be mounted on an arm 15 pivoted on the axis of the screen 2. The microscope may have a scale therein subdividing the smallest divisions of the scale screen to facilitate intermediate readings.

Since there are no moving parts in the space between the prism and the scale, in fact, no need for any parts whatsoever that would affect the formation of the image of the borderline of total reflection, it follows that the position of the latter is definite and governed only by the laws of optics.

It also follows that the range covered by my refractometer is not limited to any field of view, but that the scale screen can extend to the full length of a desired range, the latter being determined only by the physical properties of the index prism.

It is not necessary, for satisfactory results, to use the entire space between the two prisms for a single specimen, and it is perfectly feasible, to sub-divide the space, using the front portion for one specimen, and the rear portion for another specimen.

In that case, the two images at 11 and 13 of the two borderlines of total reflection would appear at the same time, which would give the operator an opportunity to check the index of the sample under observation against that of a reference sample, during one and the same operation.

This feature of the invention is of particular interest inasmuch as it can be utilized to eliminate errors due to changes in temperature of the sample. The refractive index of a substance changes slightly with changes in temperature.

Relative changes in refractive index due to temperature changes are practically parallel in similar substances, such as pure water and water solutions, but divergent in dissimilar substances, such as air and water solutions. Thus, in the instance given, the differential reading between the points 11 and 13 might vary somewhat with changes in temperature, even if both air and the solution sample had the same temperature.

But, if pure water, with a known refractive index, were substituted for the air, both the pure water and the sample solution having the same temperature, aberrations due to changes in temperature would be substantially the same in both samples, and the differential between the two samples would remain the same, regardless of temperatures.

Thus, if the reading of the index for pure water showed a slight aberration from the known index, due to a change in temperature, the same aberration would apply to the reading of the index of the solution, and the reading could be corrected accordingly.

To facilitate separation of the two samples under observation, I provide a groove 16 in the underface of the index prism which prevents spreading of liquid beyond the same, and serves to confine one liquid to the front section and the other to the rear section.

The groove might be applied longitudinally also to form two or more separated longitudinal sections, as shown in the modified form of Figure 5 at 16'.

That portion 17 of the index prism which is optically inactive is preferably masked, as shown in Figure 2.

I claim:

1. In a refractometer, an index prism having an exit surface optically effective to form an image of the borderline of total reflection at a definite distance and a screen mounted at said distance to render the image visible, the screen having a scale thereon to indicate data with respect to objects disposed in optical contact with the entrance surface of the prism and a microscope mounted for movement over the screen to give an enlarged reading of the scale divisions.

2. In a refractometer, an index prism having an exit surface optically effective to form an image of the borderline of total reflection at a definite distance, and a screen mounted at said distance to render the image visible, the screen having a scale thereon to indicate data with respect to objects disposed in optical contact with the entrance surface of the prism, and a microscope mounted for movement over the screen to give an enlarged reading of the scale divisions, the microscope having a scale operable for subdividing the divisions of the first scale.

MARTIN SILGE.

REFERENCES CITED

The following references are of record in the file of this patent:

UNITED STATES PATENTS

| Number | Name | Date |
|---|---|---|
| 1,968,202 | Hansen | July 31, 1934 |

FOREIGN PATENTS

| Number | Country | Date |
|---|---|---|
| 633,431 | France | Oct. 24, 1927 |